United States Patent
Tatarchuk et al.

(10) Patent No.: US 7,501,012 B2
(45) Date of Patent: Mar. 10, 2009

(54) MICROFIBROUS ENTRAPMENT OF SMALL REACTIVE PARTICULATES AND FIBERS FOR HIGH CONTACTING EFFICIENCY REMOVAL OF CONTAMINANTS FROM GASEOUS OR LIQUID STREAMS

(75) Inventors: Bruce J. Tatarchuk, Auburn, AL (US); Bong Kyu Chang, Knoxville, TN (US); Yong Lu, Shanghai (CN); Laiyuan Chen, Tulsa, OK (US); Eric Luna, Auburn, AL (US); Don Cahela, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 10/926,831

(22) Filed: Aug. 26, 2004

(65) Prior Publication Data

US 2005/0169820 A1 Aug. 4, 2005

Related U.S. Application Data

(60) Provisional application No. 60/498,255, filed on Aug. 26, 2003.

(51) Int. Cl.
 *B01D 53/02* (2006.01)
 *B01D 29/07* (2006.01)
(52) U.S. Cl. .................. 96/132; 96/153; 96/154; 55/524; 55/527; 422/122; 210/502.1; 210/504; 210/506
(58) Field of Classification Search .......... 96/132, 96/153, 154; 95/136, 140; 55/521, 523, 55/524, 527, 528, DIG. 33; 423/210, 247; 502/327; 422/120, 122; 210/502.1, 504, 210/506
See application file for complete search history.

(56) References Cited

U.S. PATENT DOCUMENTS 3,019,127 A * 1/1962 Czerwonka et al. ......... 428/338

(Continued)

OTHER PUBLICATIONS

Thormahlen, P., Skoglundh, M., Fridell, E., and Andersson, B., Low-Temperature CO Oxidation over Platinum and Cobalt Oxide Catalysts, Journal of Catalysis 188, 1999, pp. 300-310, Competence Centre for Catalysis, Department of Chemical Reaction Engineering, and Department of Applied Physics, Chalmers University of Technology, SE-412 96 Goteborg, Sweden.

(Continued)

*Primary Examiner*—Frank M Lawrence
(74) *Attorney, Agent, or Firm*—A. J. Gokcek; George P. Kobler; Lanier Ford Shaver & Payne

(57) ABSTRACT

A microfibrous matrix with embedded supporting particulates/fibers and chemically reactive materials is provided as a filtration system for the removal of contaminants and other harmful agents from liquid and gaseous streams. Such materials may include chemically reactive materials as high surface area carbons, zeolites, silicas, aluminas, inorganic metal oxides, polymer resins, ZnO, ZnO/Carbon, $Pt/\gamma-Al_2O_3$, $PtCo/\gamma-Al_2O_3$, $ZnO/SiO_2$ and various other catalysts, sorbents or reactants. The invention may be used to protect the intolerant anodes and cathodes of fuel cells from damaging $H_2S$ while simultaneously aiding the selective conversion of CO to $CO_2$ in fuel streams predominated by hydrogen, to provide a highly efficient gas and/or liquid separation and purification methodology for gas masks, building filtration systems, and/or as polishing media located downstream of traditional packed bed filtration systems.

15 Claims, 9 Drawing Sheets

U.S. PATENT DOCUMENTS

| | | | | |
|---|---|---|---|---|
| 3,971,373 | A * | 7/1976 | Braun | 128/206.19 |
| 4,565,727 | A * | 1/1986 | Giglia et al. | 428/172 |
| 5,080,963 | A | 1/1992 | Tatarchuk et al. | |
| 5,096,663 | A | 3/1992 | Tatarchuk | |
| 5,102,745 | A | 4/1992 | Tatarchuk et al. | |
| 5,304,330 | A | 4/1994 | Tatarchuk et al. | |
| 5,338,340 | A * | 8/1994 | Kasmark et al. | 96/135 |
| 5,582,865 | A * | 12/1996 | Rezuke et al. | 427/244 |
| 5,662,728 | A * | 9/1997 | Groeger | 96/153 |
| 5,942,323 | A * | 8/1999 | England | 428/323 |
| 5,997,829 | A * | 12/1999 | Sekine et al. | 423/210 |
| 6,231,792 | B1 | 5/2001 | Overbeek et al. | |
| 6,554,881 | B1 * | 4/2003 | Healey | 55/528 |
| 6,726,751 | B2 * | 4/2004 | Bause et al. | 96/134 |
| 2003/0207635 | A1 * | 11/2003 | Minemura et al. | 442/327 |
| 2004/0255785 | A1 * | 12/2004 | Koslow | 96/154 |

OTHER PUBLICATIONS

Torncrona, A., Skoglundh, M., Thormahlen, P., Fridell, E., and Jobson, E., Low temperature ctalytic activity of cobalt oxide and ceria promoted Pt and Pd: -influence of pretreatment and gas composition; Applied Catalysis B: Environmental 14, 1997, pp. 131-146, Competence Centre for Catalysis, Chalmers University of Technology, S-415 96, Goteborg, Sweden.

* cited by examiner

MICROFIBROUS ENTRAPMENT OF SMALL REACTIVE PARTICULATES AND FIBERS FOR HIGH CONTACTING EFFICIENCY REMOVAL OF CONTAMINANTS FROM GASEOUS OR LIQUID STREAMS

CROSS-REFERENCE TO RELATED APPLICATIONS

The present application claims priority to the Provisional U.S. Patent Application Ser. No. 60/498,255, filed on 26 Aug. 2003, and entitled "Microfibrous Entrapment of Small Reactive Particulates and Fibers for High Contacting Efficiency Removal of Contaminants from Gaseous or Liquid Streams."

STATEMENT REGARDING FEDERALLY-FUNDED RESEARCH

The United States Government has a paid-up license in this invention and the right in limited circumstances to require the patent owner to license others on reasonable terms as provided for by the terms of Contract No. DASG-60-00-C-0070, awarded by the United States Army and administered through the U.S. Army Space & Missile Defense Command (SMDC) and Auburn University.

FIELD OF THE INVENTION

The present invention generally relates to sorbents, catalysts and filters for the removal of contaminants and toxins from liquid, gaseous, and air streams. In particular, the present invention relates to a microfibrous entrapped reactive filtration system utilizing at least one of numerous materials for the removal of contaminants from liquid, gaseous, and air streams. More particularly, the present invention relates to a microfibrous entrapped reactive filtration system with entrapped small particulates and fibers of varying materials capable of high contacting efficiency removal of contaminants from liquid or air streams.

Further still, the present invention relates to a filtration separation system for the removal of toxins for use by humans in breathing, such as, but not limited to gas masks. Similarly, this invention relates to a scrubber filtration system for the removal of contaminants from (e.g. hydrocarbon reformate streams) used as fuel sources to operate Proton Exchange Membrane (PEM) fuel cells and Solid Oxide Fuel Cells (SOFC), for example. Finally, the present invention relates to a multilayer microfibrous entrapped reactive filtration system in which each layer is a thin reactive media and wherein the layers may be specifically ordered to provide a predetermined multi-stage chemical reaction/process in a small volume for flow-through liquid, gaseous and air streams.

BACKGROUND OF THE INVENTION

Numerous heterogeneous contacting methodologies have been used, including chemically reactive and adsorptive methodologies, for the real-time removal of contaminants and toxins from liquid, gaseous and air streams. These contacting methods include fluid beds, ebulated beds, trickle beds, monoliths and packed beds, among others. Among the best known of these is the packed bed which incorporates particulate matter within a containment vessel through which a contaminated liquid, gaseous or air stream is passed. One example of such a packed bed was the filter on the World War I-era gas mask carried by U.S. military personnel. Within each filter were a pre-defined thickness of compacted particulates of charcoal and other reactive materials for the removal of any toxins passing therethrough. While such methodologies were effective they suffered from numerous inefficiencies that limited the useful lives and performance attributes of the filters. Many of these inefficiencies remain in the present day methodologies used to remove a wide range of contaminants and other harmful agents from a variety of liquid, gaseous or air streams.

One example of the applicability of the present invention involves the preferential oxidation (PROX) of CO from streams comprised predominantly of $H_2$. Such processing and treatment methodologies are believed to be the most efficient way to remove CO from practical hydrocarbon reformate streams for use by poison intolerant Polymer Electrolyte Membrane (PEM) fuel cells or SOFC fuel cells for example. $Pt/Al_2O_3$ has long been known as a suitable catalyst for this purpose. Over conventional $Pt/Al_2O_3$ catalysts, however, preferential oxidation of CO in $H_2$ is known to occur only to a significant extent at temperatures above 150° C., and the maximum CO conversion usually takes place at around 200° C. With the present invention, modification of $Pt/Al_2O_3$ with a transition metal promoter may result in significantly enhanced catalytic performance for preferential CO oxidation from practical reformates in the temperature range of 25 to 150° C. This lower reaction temperature, and the maintenance of high selectivity toward CO oxidation rather than $H_2$ oxidation, permits the associated filter element to operate at the PEM fuel cell stack temperature (or become an integral portion of the stack) in the absence of additional process controls and associated hardware.

Limited contacting efficiency with the liquid, gaseous or air stream, low chemical conversation rates, limited heat and mass transfer through the filtration system, inability to regenerate, high weights, extremely limited duration of effectiveness, ineffectiveness at relatively low temperatures, and large pressure drops are among the numerous problems identified with prior art reactive filtration systems. It is, therefore, desirable to provide a multilayer microfibrous filtration system with entrapped reactive materials, including heterogeneous catalysts, electrocatalysts, sorbents, and various other solid reactant materials for the removal of contaminants and other harmful agents from a liquid, gaseous or air stream.

SUMMARY OF THE INVENTION

The present invention recognizes and addresses various of the foregoing limitations and drawbacks of chemically reactive heterogeneous contacting filtration, separation, and sorptive systems. Therefore, the present invention is directed to a microfibrous entrapped or coated reactive filtration system with entrapped particulates or fibers of a pre-defined reactive material for the high contacting efficiency removal of trace contaminants or harmful agents from liquid, gaseous or air streams. High contacting efficiency translates into smaller reaction vessels as well as multi-log reactant/contaminant reduction within the space of a few millimeters of microfibrous bed thickness.

It is, therefor, a principle object of the subject invention to provide a chemically-reactive filtration system for the removal of contaminants from liquid or gaseous streams. More particularly, it is an object of the present invention to provide a microfibrous filtration system with entrapped particulates or fibers of a pre-defined reactive material for the removal of contaminants from a liquid or gaseous stream. In such context, it is still a more particular object of the present invention to provide a multilayer microfibrous filtration system with entrapped particulates of predetermined reactive materials for the staged removal of numerous contaminants from a liquid, gaseous or air stream. Still further, it is an object of this invention to provide such a multilayer microfibrous filtration system in which physical entrapment of the reactant material within a microfibrous carrier matrix permits the reaction medium to operate in a variety of orientational, geometrical and vibrational environments without the traditional concerns for the influences of gravity, flow rate and fludization versus particle size or density based thermal convection.

Still further, it is a principle object of this invention to provide a microfibrous support structure for retaining and entrapping particulate or fiber materials that are chemically reactive toward a predetermined reactant or contaminant. It is a further object of the present invention to provide such a particulate enhanced support structure in multiple layers to provide for a pre-determined sequence for the removal of one or more reactants/contaminants. In such context, it is an object of the present invention to provide a microfibrous support structure with entrapped particulates of chemically reactive materials wherein such support structure is generally less than 1 cm and preferably less than 2 mm in thickness.

Yet still further, it is a principal object of the present invention to provide a microfibrous chemically-reactive filtration system with entrapped support particles containing nanodispersed ZnO. It is a further object of the present invention to provide such a filtration system with a plurality of layers and wherein at least one of such layers contains entrapped particles of a PROX-CO catalyst such as $Pt/\gamma-Al_2O_3$ or $PtCo/\gamma-Al_2O_3$. Finally, it is an object of this invention to provide a chemically-reactive filtration system suitable for use in fuel cells, lubricant filtration, gas masks, air handling, water purification, or generally any endeavor in which the purity of a liquid or gas stream is required.

Additional objects and advantages of the invention are set forth in, or will be apparent to those of ordinary skill in the art from, the detailed description as follows. Also, it should be further appreciated that modifications and variations to the specifically illustrated and discussed features and materials hereof may be practiced in various embodiments and uses of this invention without departing from the spirit and scope thereof, by virtue of present reference thereto. Such variations may include, but are not limited to, substitutions of the equivalent means, features, and materials for those shown or discussed, and the functional or positional reversal of various parts, features, or the like.

Still further, it is to be understood that different embodiments, as well as different presently preferred embodiments, of this invention, may include various combinations or configurations of presently disclosed features, elements, or their equivalents (including combinations of features or configurations thereof not expressly shown in the figures or stated in the detailed description).

These and other features, aspects and advantages of the present invention will become better understood with reference to the following descriptions and appended claims. The accompanying drawings, which are incorporated in and constitute a part of this specification, illustrate an embodiment of the invention and, together with the descriptions, serve to explain the principles of the invention.

In one exemplary embodiment, there may be provided a less than three (3) millimeter thick multilayer microfibrous structural support with entrapped particulate reactive materials suitable for use in removing $H_2S$ and CO from a gaseous stream, for example that required to operate a PEM fuel cell. The microfibrous structure may be comprised of intertwined sinter-bonded metal, polymer, glass or ceramic fibers with individual diameters between about 1 and about 50 μm. Entrapped within the microfibrous structure may be approximately 5-350 μm diameter carbon, $SiO_2$, alumina and other typical inorganic metal oxide or polymer resin support particulates or various (approximately 1-50 μm diameter) support fibers. This basic microfibrous support/carrier structure may comprise between generally about 1.5 and 10 vol % but may range from between generally about 0.5 to generally about 50 vol %. Within this microfibrous carrier, the loading of the reactant phase can range typically from 5 to 20 vol % and more generally anywhere from 0 to about 60 vol %.

Traditional high speed and low cost paper making equipment and techniques may be used to prepare the composite material. In such a process, μm diameter metal, polymer, glass, or ceramic fibers in a variety of compositions and alloys may be slurried in an aqueous suspension (along with optional binders, if required) and with the possible use of cellulose fibers and other selected reactant or support particulates such as, but not limited to, alumina support particles. The resulting mixture may then be cast into a preformed sheet using a wet-lay process and dried to create a sheet of preformed material. Where a water soluble binder is used in this preparation, drying may be sufficient to fuse the fibers at their junctures, but in the case of those preforms utilizing cellulose, subsequent pre-oxidation in an $O_2$ flow at approximately 500° C. for generally about one hour may be employed to remove the bulk of cellulose. Subsequent sintering of the preform in an $H_2$ flow at an elevated temperature (approximately 900° C.) for generally about thirty minutes allows for removal of the remaining cellulosic binder/pore former and entraps the selected support particulates within a sinter-locked network of metal, glass or ceramic fibers.

The sintering temperatures and gaseous conditions employed depend greatly upon the choice of fibers, support or reactant particle employed. If polymer fibers are employed much lower temperatures are utilized depending upon their melting and softening temperatures. These temperatures are generally between 100 to 400 C and the process can be greatly abetted by use of bi-component polymer fibers which are prepared with a lower melting polymer coating/sheath on top of a higher melting polymer core fiber. Sintering/heating these fibers at the melting temperature of the sheath polymer causes them to bond upon cooling while maintaining a rigid and open fibrous structure provided by the higher melting core fiber. In those cases where polymer fibers are employed, cellulose binders often used during the wet-lay process may be allowed to remain within the finished article or eliminated all together from the wet-lay process.

Alternatively, ceramic and glass fibers can be sintered in oxidizing, reducing, vacuum or inert gaseous environments. The choice of environment can be selected to match the chemical and thermal stability of the reactant and support particulates. The microfibrous entrapped support particles or fibers, such as, but not limited to, alumina, carbon, silica, etc., may then be impregnated with the metal salt precursor solutions. This subsequent addition of metal salts and metal catalysts would be essential, for example, in those cases where the high temperatures required to sinter metal or ceramic fibers would also prove deleterious to the structure and activity of catalyst material. If these sintering conditions do not pose such a problem, then fully impregnated catalyst/support particles may be used from the outset. This is a distinct advantage provided by low melting temperature glass and polymer fibers which can be readily fused at temperatures which do not deactivate many of the broadly available yet thermally sensitive catalyst and sorbent formulations. Finally, those microfibrous entrapped materials that have been chemically impregnated after sintering (due to the fact that the temperature stability limit for impregnant is less than the sintering temperature for the fiber) may be dried and calcined at desired temperatures so as to place the reactive material in its desired state.

Reactive materials, such as ZnO, ZnO/Carbon or ZnO/ $SiO_2$ (e.g., $H_2S$ sorbents/reactants) or any combination of the three, may be placed onto the supports of at least one of these layers, as above described at loadings of between about 15 and 20 wt %. In particular, the ZnO/Carbon reactive material may provide excellent performance in removing $H_2S$ at low temperature PEM fuel cell stack temperatures (from 0 to 100 C) and thus may serve as a protective measure against exposure of the typically platinum anode and cathode catalysts against irreversible sulfur poisoning in the PEM fuel cell.

In a second layer of the multilayer structure a preferential catalytic oxidation CO (PROX CO) catalyst may be similarly impregnated onto the filtration layers support by the above described incipient wetness impregnation technique. Within such a layer, the support may be about a 150 micron diameter gamma alumina support entrapped within a sintered matrix of Ni, polymer, ceramic, glass or alloy fibers. The PROX CO catalyst may comprise cobalt promoted $Pt/Al_2O_3$. The high activity and desirable selectivity over a wide operating temperature range of such catalysts provides superior performance in reformate streams from between generally about 0° C. to generally about 200° C.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 3A through 3F depict SEM images of support particles entrapped within a microfiber matrix of fibers in accordance with an exemplary embodiment of the present invention, wherein FIGS. 3A and 3B are Ni fibers entrapping a Pt—Co/AL2O3 catalyst, FIGS. 3C and 3D are polyethylene on polyester bi-component polymer fibers entrapping an activated carbon adsorbent, and FIGS. 3E and 3F are silica-alumina-magnesia fibers entrapping a ZnO impregnated SiO2 support particulate.

Figure 1:
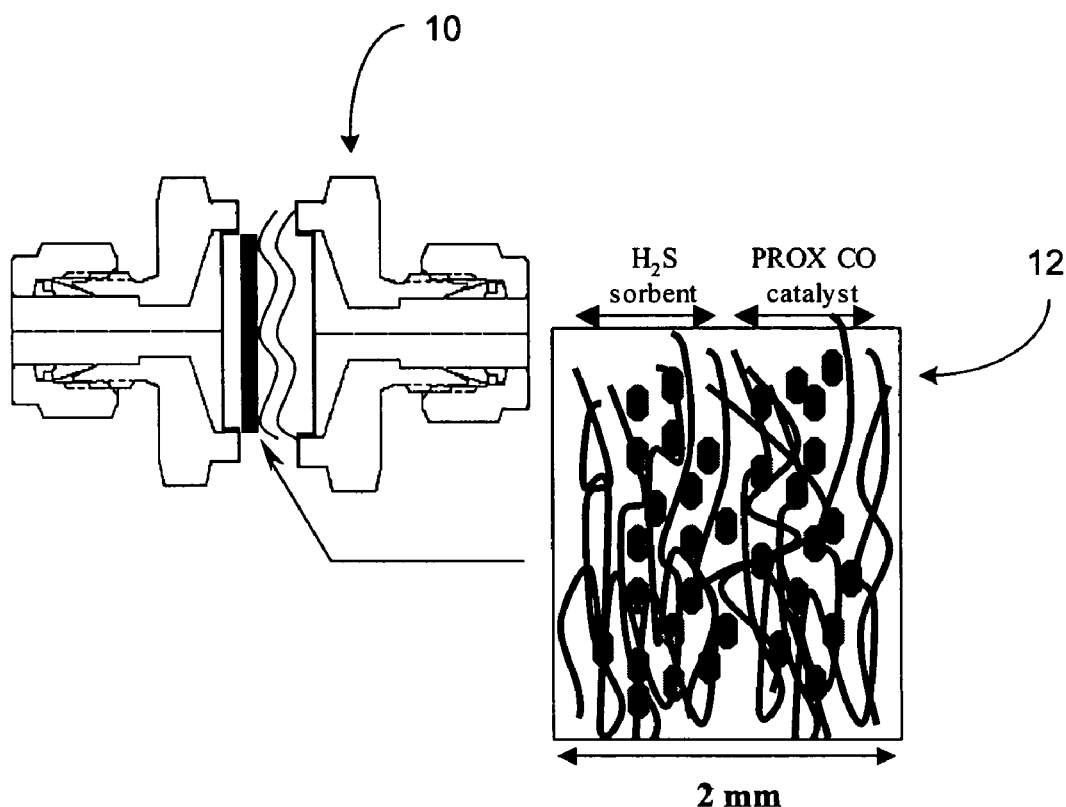
FIG. 1 is a schematic diagram of an exemplary integrated $H_2S$ and PROX CO removal units utilizing an exemplary microfibrous entrapped PROX CO catalyst and $H_2S$ sorbent in accordance with the present invention.

Repeat use of reference characters throughout the present specification and appended drawings is intended to represent the same or analogous features or elements of the various exemplary embodiments of the present invention described and shown.

DETAILED DESCRIPTION OF THE PREFERRED EMBODIMENTS

Reference will now be made in detail to a presently preferred embodiment of the invention, examples of which are fully represented in the accompanying drawings. Such examples are provided by way of an explanation of the invention, not limitation thereof. In fact, it will be apparent to those skilled in the art that various modifications and variations can be made in the present invention, without departing from the spirit and scope thereof. For instance, features illustrated or described as part of one embodiment can be used on another embodiment to yield a still further embodiment. Still further, variations in selection of materials and/or characteristics may be practiced, to satisfy particular desired user criteria. Thus, it is intended that the present invention cover such modifications and variations as come within the scope of the present features and their equivalents.

As disclosed above, the present invention is particularly concerned with a multilayer microfibrous structural support with entrapped particulate or fibrous reactive materials suitable for use in removing contaminants from a liquid or gaseous stream, such as for example within a PEM fuel cell, through a gas mask or through a protective filter for a building or other structure. Such filtration systems are preferably capable of operating at smaller thicknesses, lower weights and volumes, lesser pressure drops, lower costs and with greater reliability and efficiency.

FIG. 1 depicts one exemplary embodiment of the present invention in use 10, in which a combination system of microfibrous entrapped $H_2S$ sorbent is placed on top of microfibrous entrapped PROX CO catalysts to form an integrated reactor 12 suitable for a removal of undesired $H_2S$ and CO contaminants within the hydrogen gas/fuel stream passing therethrough to a poison intolerant PEM fuel cell. The ability of the present invention to provide such a multi-staged reactor in only a few millimeters thickness allows for significantly reduced pressure drop and high contacting efficiency through the integrated reactor 12, thereby reducing the risk of poisoning to the PEM fuel cell and extending its useful life on stream. The embodiment of FIG. 1 has been demonstrated to provide a greater than 5-log reduction in $H_2S$ concentration and at least a 4-log reduction in CO concentration. This attribute is a direct result of the small catalyst and sorbent particulates which are entrapped within the microfibrous matrix, as well as, the uniformity by which the aforementioned procedures disperse these particulates within the matrix and the high level of static mixing imparted by the fibers.

Figure 2:
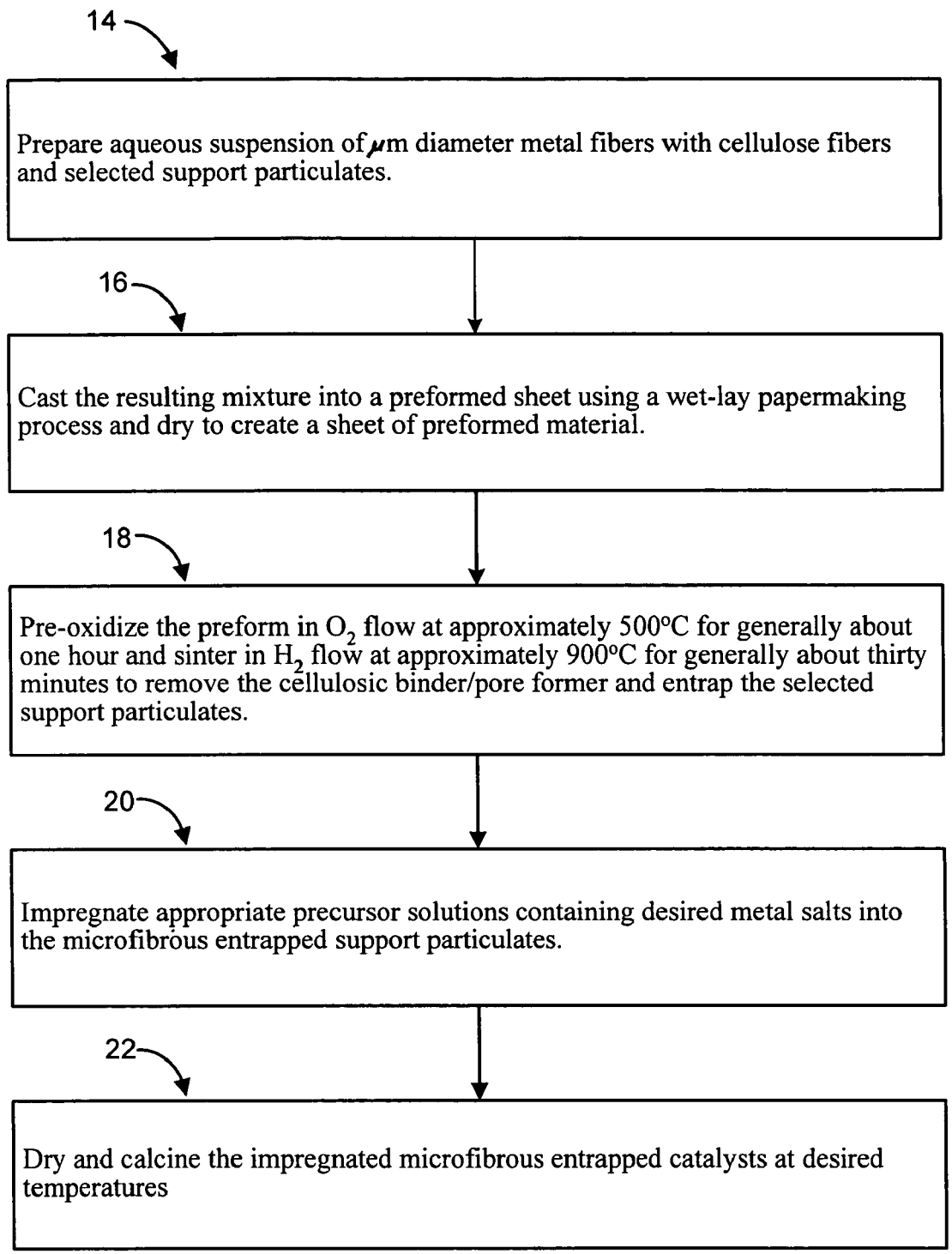
FIG. 2 is an exemplary flowchart illustrating one method of preparation of an exemplary microfibrous entrapped catalysts structure in accordance with the present invention.
Figure 3A:
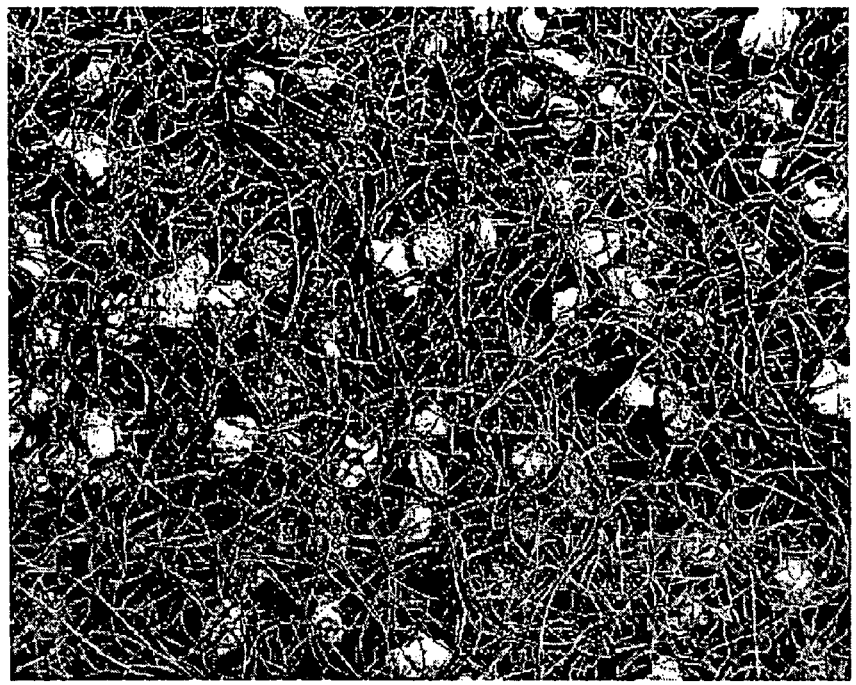
Figure 3B:
Figure 3C:
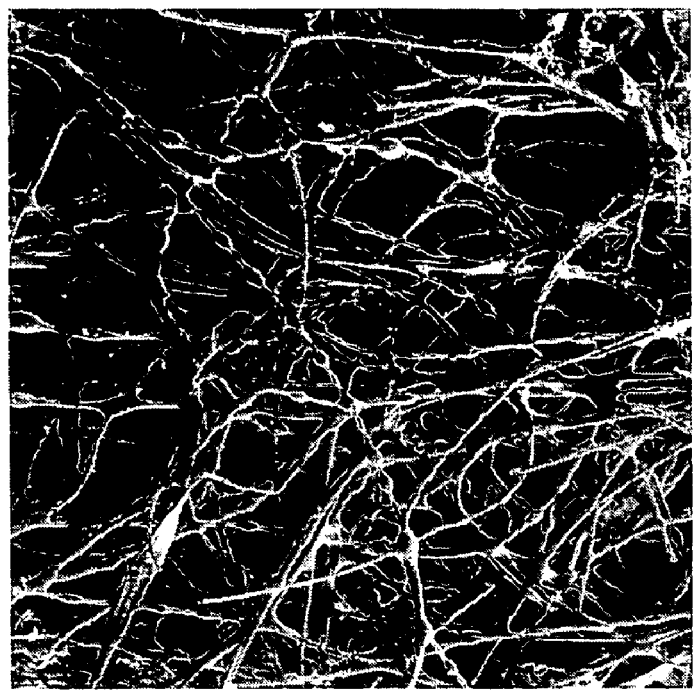
Figure 3D:
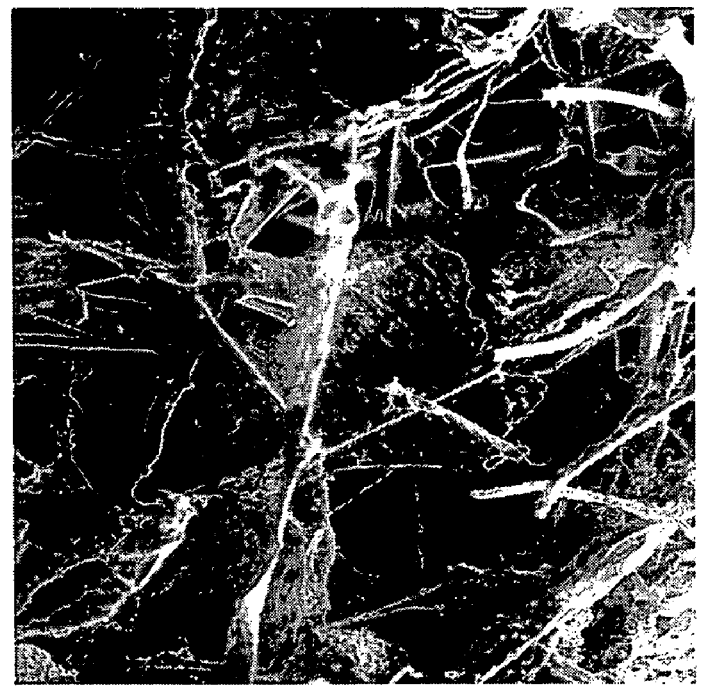
Figure 3E:
Figure 3F:
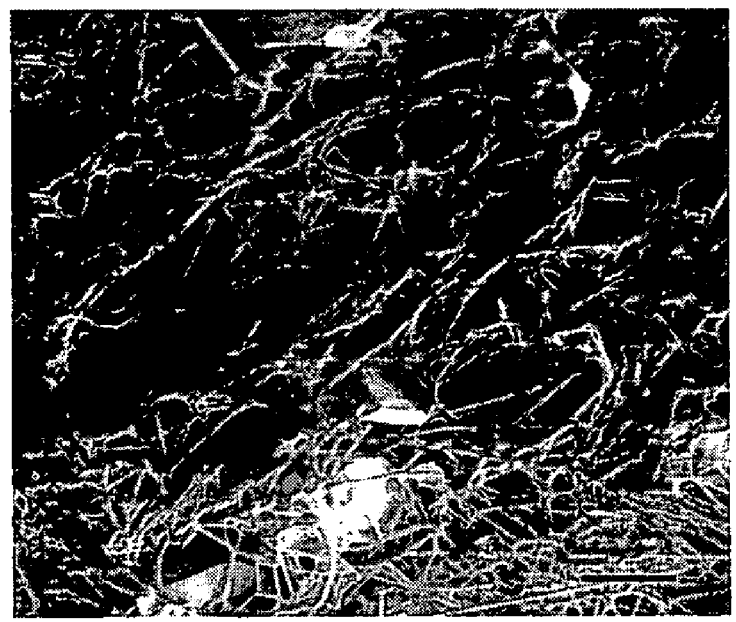
Figure 4:
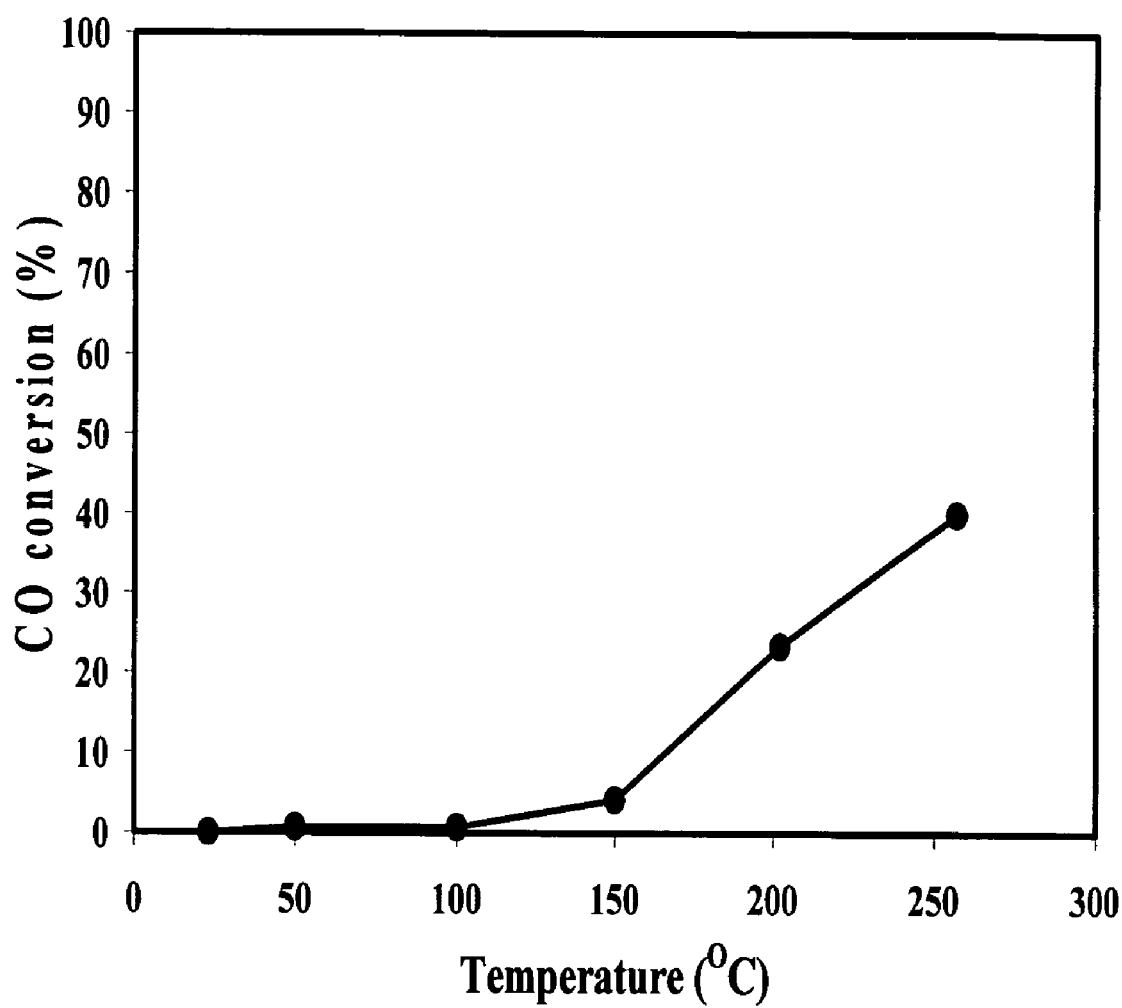
FIG. 4 is a graph showing the CO oxidation activity over a Cobalt promoted Alumina support in the absence of the Pt metal catalyst in accordance with one embodiments of the present invention as a function of reaction temperature.

As shown in FIG. 2, a single-layer reactor, as best seen in the SEM images of FIGS. 3A and 3B, is produced through a multi-stage process. First, μm diameter metal fibers in a variety of compositions and alloys are slurried in an aqueous suspension with cellulose fibers and other selected particulates 14. The resulting mixture is then cast into a preformed sheet using a wet-lay process and dried to create a sheet of preformed material 16. The pre-formed material is then pre-oxidized in an $O_2$ flow at approximately 500° C. for generally about one hour and sintered in an $H_2$ flow at approximately 900° C. for generally about thirty minutes to remove the cellulosic binder/pore former and to entrap the selected support particulates within a sinter-locked network of conductive metal fibers 18. The microfibrous entrapped support particles are impregnated with the desired metal salt precursor solutions containing the metal salts desired for a particular application of the reactor 20. Finally, the microfibrous entrapped catalysts are dried and calcined at the appropriate temperatures 22. FIG. 2 is an exemplary flow diagram for one particular embodiment of the present invention (i.e., FIGS. 3A & 3B). Materials depicted in FIGS. 3C to 3F, for example, are prepared in Accordance with alternative processes/flow charts described earlier. The sequence and nature of the specific steps depends centrally upon the temperature required to sinter-bond the entrapping fibers and the various thermal stability limits of the catalyst, support and sorbent formulations which are to be incorporated within the microfibrous carrier.

EXAMPLES

In one exemplary embodiment of the present invention in which the filtration reactor of the present invention is specifically designed for conversion of CO upstream of a PEM fuel cell, it can be seen that in the absence of Pt metal there exists no CO oxidizing activity at temperatures below 100° C. where a Co promoted Alumina support is used in the reactor. Even at temperatures above 250° C., CO conversion is only 40%. This is explained by the fact that Pt plays a crucial role in CO oxidation by providing the sites for CO adsorption and the Co promoter on alumina allows for more facile $O_2$ adsorption. As a result, it can be seen that the present invention, including, but not limited to the present embodiment of a Co promoted Pt/Alumina catalyst within the microfibrous filtration mesh/reactor, provides an increased selective CO oxidation removal activity thus extending the life of any downstream PEM anode or cathode catalysts which are extremely sensitive to CO poisons.

Figure 5A:
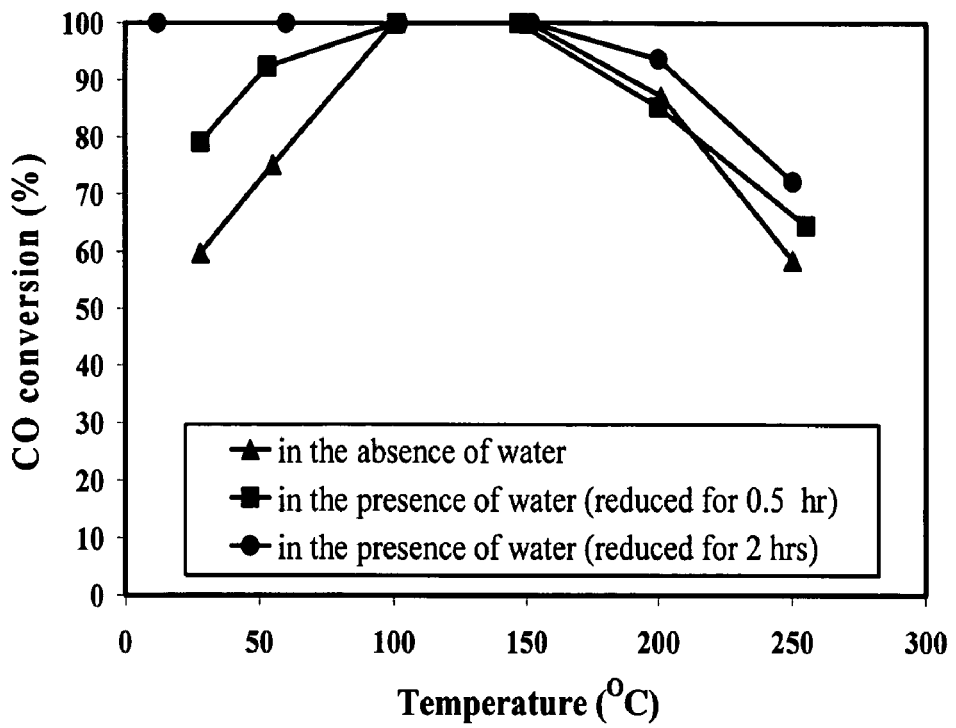
FIGS. 5A and 5B depict a comparison of the performance of an exemplary embodiment of the present invention having a 1.1 wt % Pt—Co/Alumina catalyst for the selective oxidation of carbon monoxide both in the absence and presence of $H_2O$.
Figure 5B:
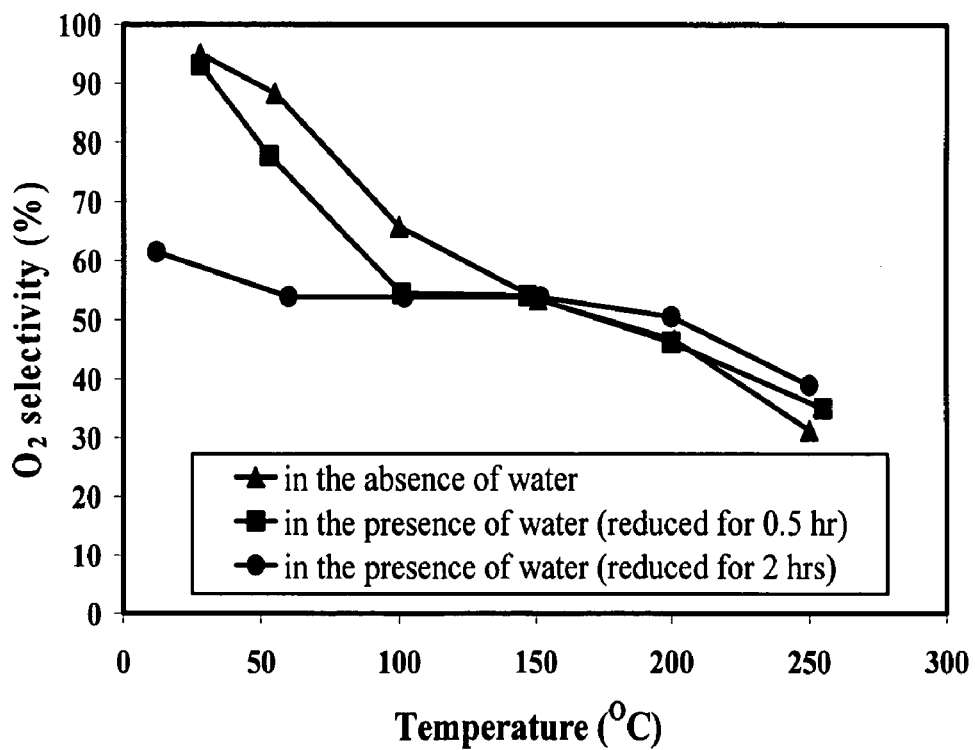
Figure 6A:
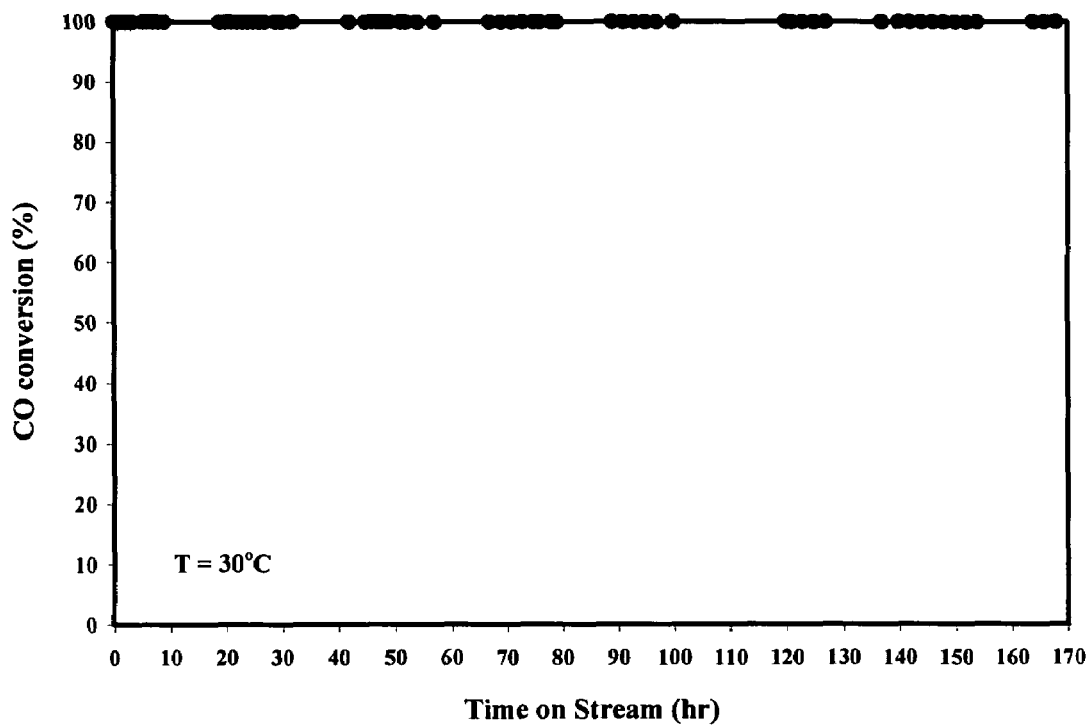
FIGS. 6A and 6B depict the stability of a microfibrous entrapped Pt—Co/Alumina filtration system in accordance with the present invention for the PROX CO reaction at 30° C. in terms of CO conversion and $O_2$ selectivity, respectively.
Figure 6B:
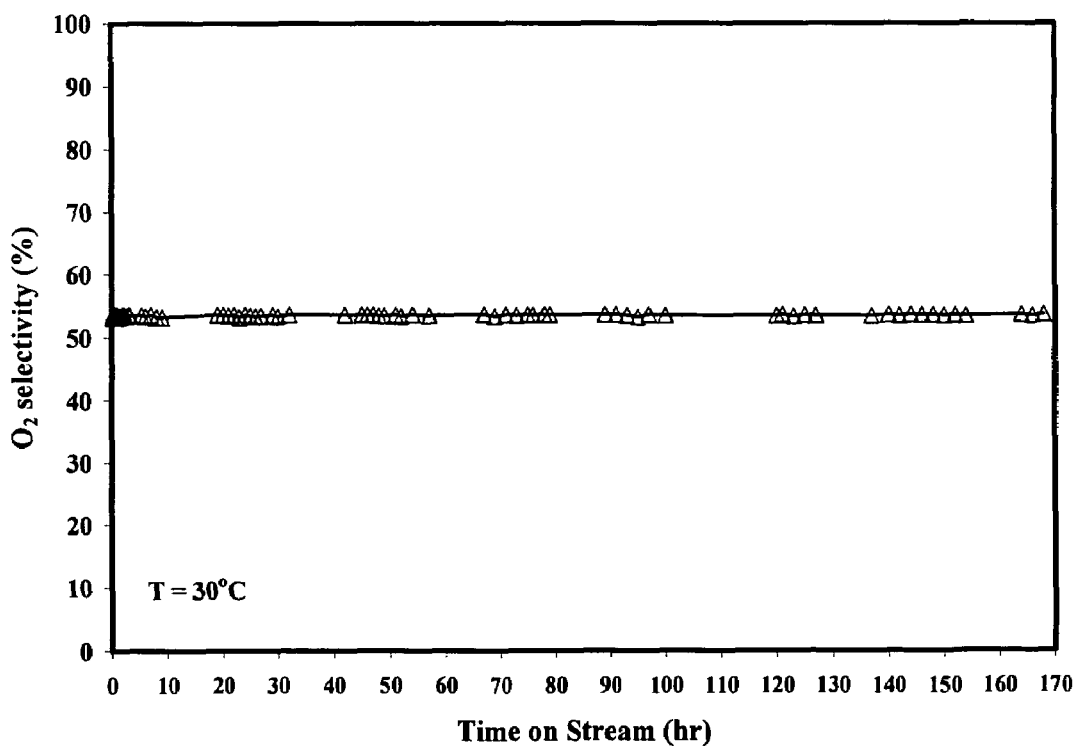
Figure 7A:
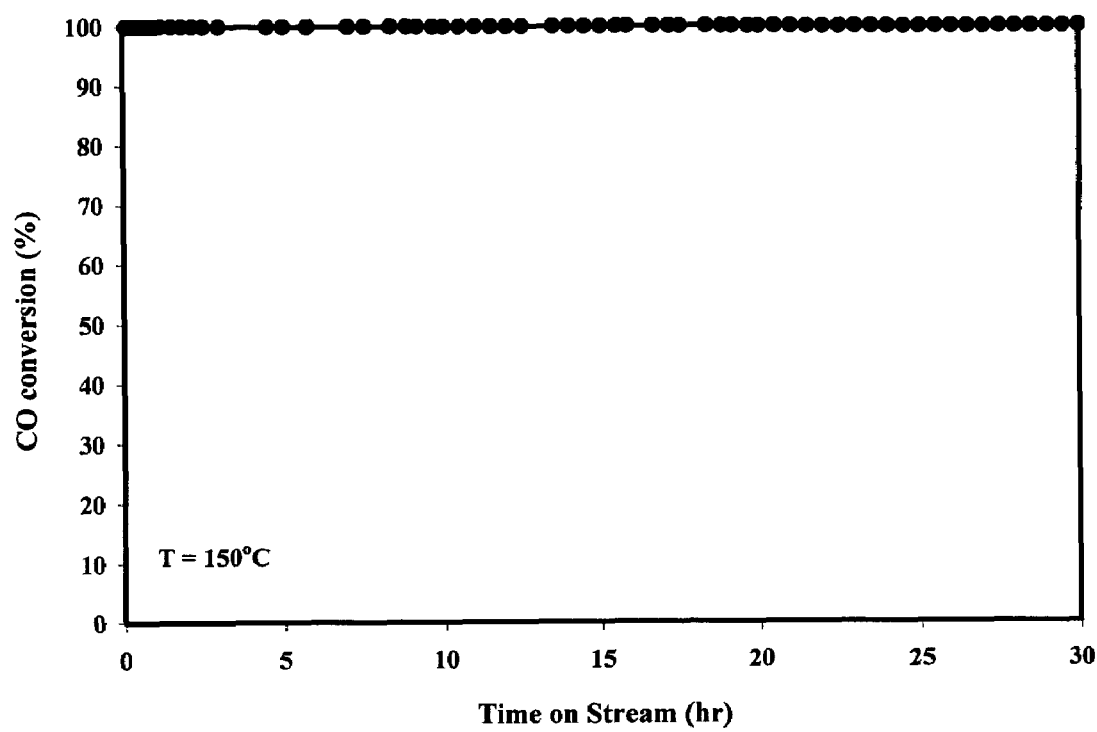
FIGS. 7A and 7B depict the stability of the microfibrous entrapped Pt—Co/Alumina filtration system of FIGS. 6A and 6B for PROX CO reaction at 150° C. in terms of CO conversion and $O_2$ selectivity, respectively.
Figure 7B:
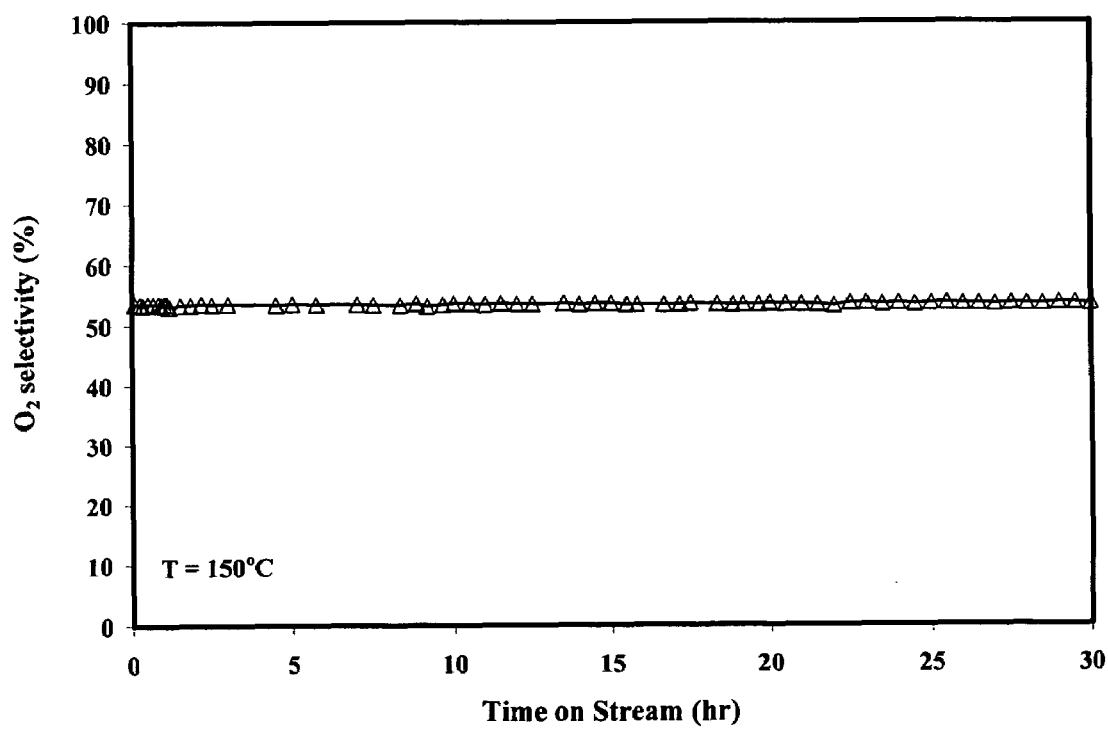

Typically PEM fuel cells have upwards of 30 vol % $H_2O$ content in their feed gas. As seen in FIGS. 5A and 5B, it is apparent that the performance of the above-described Pt—Co/Alumina catalyst embodiment of the present invention is enhanced even in the presence of $H_2O$. In fact, the performance of the Pt—Co/Alumina catalyst for the selective oxidation of CO in the absence of $H_2O$ is severely reduced. Therefore, the presence of $H_2O$ in the PEM fuel cell feed gas, the typical real-life scenario, is beneficial for the performance of the Pt—Co/Alumina catalyst. As such, PROX catalysts able to remove CO in the presence of background $H_2O$ provide a critical requirement for practical PEM fuel cell systems, this exemplary embodiment of the present invention can be shown to effectively reduce chemical deterioration of the fuel cell anodes or cathodes that occur due to a build up and strong chemical adsorption of CO on the anode and cathode catalyst surfaces of typical PEM fuel cells.

FIGS. 6A, 6B, 7A, and 7B depict test results showing that the above-described Pt—Co/Alumina catalyst embodiment of the present invention is ideal for transient operations and polishing fuel filters as a final defense line for PEM fuel cells, as well as, for preferential oxidation of CO in steady-state operating conditions. At a low temperature of 30° C., complete CO conversion activity has been shown to be capable of maintenance for a week without deactivation. Further, the stability of microfibrous entrapped Pt—Co/Alumina for PROX CO reactions at high temperatures (150° C.) in terms of CO conversion and $O_2$ selectivity, respectively, still allowed for complete CO conversion activity for approximately 30 hours without deactivation.

Although a preferred embodiment of the invention has been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged both in whole or in part. Therefore, the spirit and scope of the appended claims should not be limited to the description of the preferred version contained herein.

What is claimed is:

1. A filtration system comprising:
   a) a plurality of layers, each layer being reactive and including a matrix of sinter-bonded microfibers;
   b) support, adsorbent or reactive particulates and/or fibers entrapped within said matrix;
   c) a pre-selected reactive material impregnated into said matrix and supported by said particulates and/or fibers;
   d) wherein thin sheets of the matrix with the supporting particulates, reactants, adsorbents and/or fibers and the pre-selected reactive materials impregnated therein are chemically functionalized and then stacked in a pre-defined sequence; and
   e) wherein the predefined sequence has an upstream packed bed of larger diameter reactive catalyst and sorbent particulates and a downstream polishing layer of smaller diameter microfibrous entrapped reactive catalyst and sorbent particulates; and
   f) wherein the filtration system removes contaminants from liquid and gaseous streams.

2. The filtration system of claim 1, wherein said thin sheets are less than a three millimeters in thickness.

3. The filtration system of claim 1 wherein said thin sheets provide high contacting efficiency and small critical bed depth such that said thin sheets may be made extremely thin and still achieve high levels of saturation, reaction and/or contaminant removal.

4. The filtration system of claim 3 wherein said adsorption and reaction levels provide greater than a 5-log differential in concentration between inlet and outlet concentrations of said contaminants.

5. The filtration system of claim 3 wherein said thin sheets comprise a sorbent system of specified gas life capacity and volume, wherein the pressure drop through said bed depth decreases with the square of said bed depth's cross-sectional area.

6. The filtration system of claim 4 wherein said thin sheets are sealed into a chemically protective hood for human use so as to permit small volume/mass packaging via folding into an easily carried package and wherein said hooded thin sheets are laminated with a thin sheet of HEPA filtration media so as to provide both particulate and gas removal/protection for the wearer.

7. The filtration system of claim 3 wherein said filtration system advantageously utilizes the volume loading capacity of said packed bed and the overall contacting/removal efficiency of the polishing layer.

8. The filtration system of claim 2 wherein said reactive materials are a PROX CO catalyst.

9. The filtration system of claim 2 wherein said reactive materials include optimized multiple $H_2S$ removal sorbents/reactants for both low and high temperature performance and regenerability.

10. The filtration system of claim 9 wherein said reactive materials comprising said optimized multiple $H_2S$ removal sorbents/reactants include ZnO/Carbon and $ZnO/SiO_2$, respectively.

11. The filtration system of claims 6 or 7 or 8 or 9 wherein said reactive materials are layered to achieve pre-determined operations capabilities with regard to temperature, selectivity, and outlet gas performance/compositions.

12. The filtration system of claim 1 wherein loading of the reactive material within said matrix and the corresponding intra-layer void volume, the matrix thickness and its cross-sectional area are pre-selected to maximize the reaction rate per unit volume, the reaction rate per unit mass, and/or the reaction rate per unit pressure drop.

13. The filtration system of claim 1 wherein said microfibers of said matrix are metal fibers and wherein said microfibers impart high temperature operational characteristics, certain malleability and joining/bonding capabilities, and/or electrical conductivity and IR self-heating attributes to said filtration system.

14. The filtration system of claim 1 wherein said microfibers of said matrix are polymer, glass and/or ceramic fibers and wherein said micro fibers impart specific corrosion/chemical resistance, thermal stability behavior, mechanical properties, specific cost factors, and overall density attributes to said filtration system.

15. The filtration system of claim 1 wherein said matrix is pleated or similarly structured so as to reduce the effective face velocity of incoming reactant streams, increase intra-layer residence times, and reduce overall pressure drop.

* * * * *